(12) United States Patent
Burguburu

(10) Patent No.: US 11,391,462 B2
(45) Date of Patent: Jul. 19, 2022

(54) TURBINE ENGINE COMBUSTION CHAMBER WITH FIXED DUCT GEOMETRY

(71) Applicant: SAFRAN AIRCRAFT ENGINES, Paris (FR)

(72) Inventor: Joseph Jean Marie Burguburu, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 184 days.

(21) Appl. No.: 16/147,130

(22) Filed: Sep. 28, 2018

(65) Prior Publication Data
US 2019/0101290 A1 Apr. 4, 2019

(30) Foreign Application Priority Data
Sep. 29, 2017 (FR) .................................. 1759111

(51) Int. Cl.
| F23R 3/06 | (2006.01) |
| F02C 7/266 | (2006.01) |
| F23R 3/60 | (2006.01) |
| F23Q 3/00 | (2006.01) |

(52) U.S. Cl.
CPC .............. *F23R 3/06* (2013.01); *F02C 7/266* (2013.01); *F23Q 3/008* (2013.01); *F23R 3/60* (2013.01); *F05D 2240/35* (2013.01); *F23R 2900/00012* (2013.01); *F23R 2900/03042* (2013.01); *F23R 2900/03043* (2013.01); *F23R 2900/03044* (2013.01)

(58) Field of Classification Search
CPC .......................... F23R 3/06; F23R 3/60; F23R 2900/03042–03044; F02C 7/266; F23Q 3/008
See application file for complete search history.

(56) References Cited

U.S. PATENT DOCUMENTS

| 8,479,490 B2* | 7/2013 | Zupanc .................. F23R 3/002 60/39.821 |
| 2007/0051110 A1 | 3/2007 | Holland et al. |
| 2010/0212324 A1* | 8/2010 | Bronson ................ F02C 7/264 60/752 |

(Continued)

FOREIGN PATENT DOCUMENTS

| EP | 2871419 A1 | 5/2015 |
| FR | 2958373 A1 | 10/2011 |

(Continued)

OTHER PUBLICATIONS

French Application No. 1759111, Search Report and Written Opinion dated May 25, 2018, 8 pgs. (in French, relevance found in citations).

*Primary Examiner* — Katheryn A Malatek
(74) *Attorney, Agent, or Firm* — Lathrop GPM LLP

(57) ABSTRACT

The invention relates to a combustion chamber comprising:
a duct (722) with a recess for a spark plug (13) emerging into an inner space of the combustion chamber,
and a plug guide mounted on the duct so as to be movable transversely relative to the axis of the duct.
The duct is crossed by openings (722b) which, parallel to the axis of the duct, are staggered in a plurality of rows (74a, 74b . . .) over the height (H) of the duct, with at least some of the openings individually having a diameter of 0.2 to 0.6 mm.

18 Claims, 4 Drawing Sheets

(56) References Cited

U.S. PATENT DOCUMENTS

| | | | |
|---|---|---|---|
| 2011/0113748 A1* | 5/2011 | Lains | F23R 3/60 |
| | | | 60/39.827 |
| 2015/0013571 A1 | 5/2015 | Gerendás | |
| 2016/0025342 A1* | 1/2016 | Erbas-Sen | F02C 7/18 |
| | | | 60/772 |
| 2016/0377289 A1* | 12/2016 | Kostka, Jr. | F23R 3/04 |
| | | | 60/752 |

FOREIGN PATENT DOCUMENTS

| | | |
|---|---|---|
| JP | S5774521 A | 5/1982 |
| WO | WO 2011/061143 A1 | 5/2011 |

* cited by examiner

| Conditions: | $0.3 \times 10^5$ Pa, -25°C | $1 \times 10^5$ Pa, +25°C | $30 \times 10^5$ Pa, +570°C |
|---|---|---|---|
| Thickness of the duct wall: | Thickness of the boundary layer (planar plate) | | |
| After 1 mm | 0.10 mm | 0.07 mm | 0.04 mm |
| After 2 mm | 0.14 mm | 0.09 mm | 0.07 mm |

TURBINE ENGINE COMBUSTION CHAMBER WITH FIXED DUCT GEOMETRY

CROSS-REFERENCE TO RELATED APPLICATION

This application claims priority to French Patent Application No. 1759111, filed Sep. 29, 2017, which is incorporated herein by reference.

SUMMARY OF THE INVENTION

The present invention relates to the field of gas turbine engines for aircraft, such as turbojet engines, and relates more specifically to the arrangement of a spark plug in the combustion chamber of this type of engine.

In such an engine, the combustion chamber receives air from the compressor, a portion of which is mixed with the fuel and burned in the primary combustion zone. Ignition is provided by at least one spark plug arranged downstream from the carburetor system. Another portion of the air bypasses the primary combustion zone and mixes with the primary combustion gases. Next, all the hot gases are directed towards the turbine.

WO 2011/061143 discloses a combustion chamber of a gas turbine engine for aircraft which comprises:
  a duct having an axis, the duct, which is crossed by openings, forming internally a recess for a spark plug emerging into an inner space of the combustion chamber,
  a plug guide mounted on the duct so as to be transversely mobile relative to the axis of the duct.

Combustion chambers are designed to comply with mandatory specifications such as reigniting during flight, the shape of the temperature profile, gas emissions as well as both the thermal and mechanical resistance of the components. In particular, the ignition system must provide reignition during flight in the event of the combustion chamber accidentally switching off, including under windmilling conditions (blades or vanes turning freely), while withstanding the thermal constraints to which they are exposed under the usual operating conditions of the chamber. Remember that windmilling occurs when the engine stops and the blades of the fan and compressor of the turbine engine continue to turn due to the speed of the air that passes through same (without needing combustion).

The invention discloses a solution that makes it possible to reconcile two constraints at once:
  igniting the chamber during windmilling, with the smallest possible amount of cooling air injected into the chamber, and
  good thermal resistance of the zone close to the spark plug, with the engine operating at high speed.

The solution of WO 2011/061143 does not contemplate or even particularly allow this.

The invention also suggests, parallel to the axis of the duct, for the openings passing through the duct to be staggered in a plurality of rows, at least some of said openings individually having a diameter of 0.2 mm to 0.6 mm.

These staggered through-openings preferably number 50 to 500.

Regardless, the invention proposes a solution that includes the equivalent of a variable geometry, while not including any moving mechanical parts, in order to ensure a satisfying service life for the system.

A favorable reduction of the flow rate coefficient is obtained in the openings in question when the pressure drops.

In order to further promote this effect, it is proposed for at least some of said openings passing through the duct to be individually angled relative to a perpendicular to the axis of the duct.

By angling the openings individually in an azimuthal direction, the length of these openings is increased compared with the solutions used in existing engines. Thus, the aforementioned effect of reducing the flow rate coefficient while the pressure drops will be increased.

In this regard, it is also advisable for said (at least some) openings, individually angled relative to a perpendicular to the axis of the duct, to extend individually in a direction belonging to a plane perpendicular to the axis of the duct.

Also in this regard, it is advisable for said (at least some) openings, individually angled relative to a perpendicular to the axis of the duct, to be straight.

Thus, the air will be added by rows, or levels, and the openings will be easier to produce.

In order to achieve the same type of sought effect, it is furthermore also advised:
  for said (at least some) openings, individually angled relative to a perpendicular to the axis of the duct, to be angled in directions belonging to the same plane (P4 below) perpendicular to the axis of the duct, and/or
  for each row to be located in a plane (P4) perpendicular to the axis of the duct.

In principle, the production of the ducts and, in particular, the boring thereof is facilitated, and a homogeneous distribution of the cooling air near the spark plug is also promoted.

The invention, which also applies to a gas turbine engine for aircraft comprising the combustion chamber having all or part of the preceding features, will eventually be understood more completely below, and other aims, details, features and advantages of same may appear with greater detail in reference to the following description, wherein the embodiment(s) of the invention are given as merely illustrative, non-exhaustive examples in reference to the appended schematic drawings.

BRIEF DESCRIPTION OF THE DRAWINGS

The following figures relate to embodiments according to the invention, as follows.

DETAILED DESCRIPTION

Figure 1:
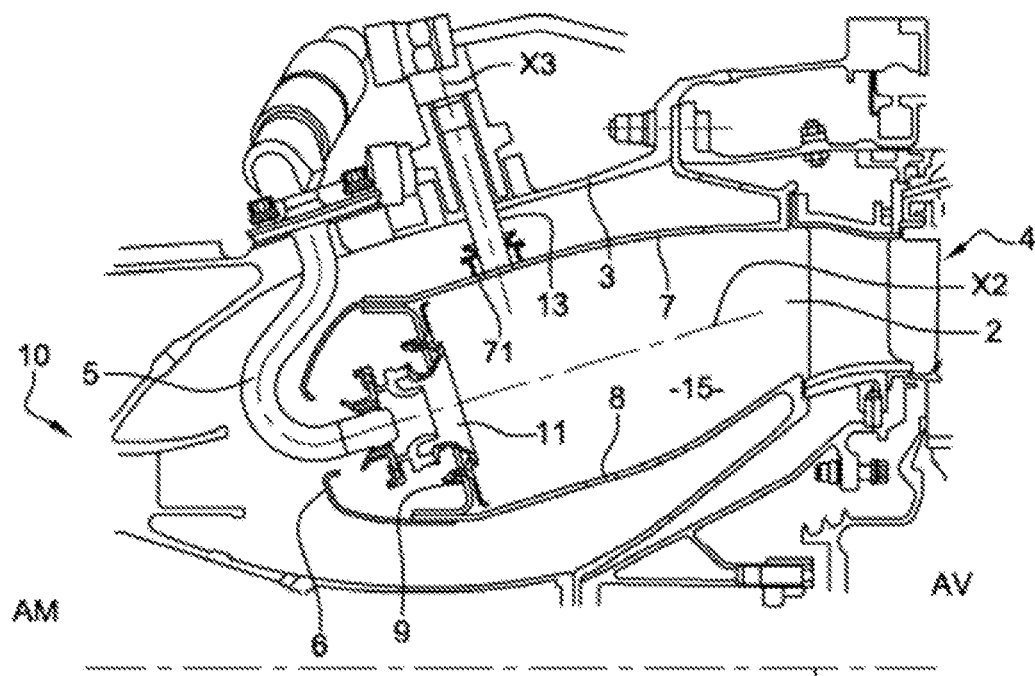
FIG. 1 shows, in longitudinal cross-section, a portion of a combustion chamber of a gas turbine engine according to the prior art.
Figure 2:
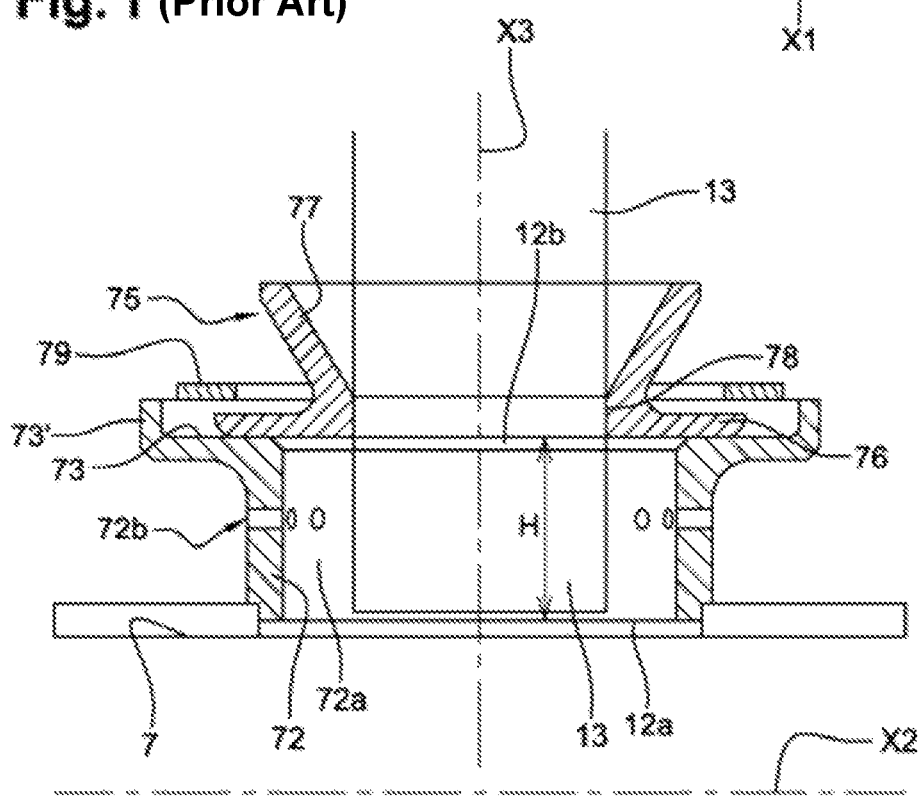
FIG. 2 shows the detail of the zone according to the prior art where a spark plug is flush with a duct and a plug guide as shown in FIG. 1.
Figures 4, 5:
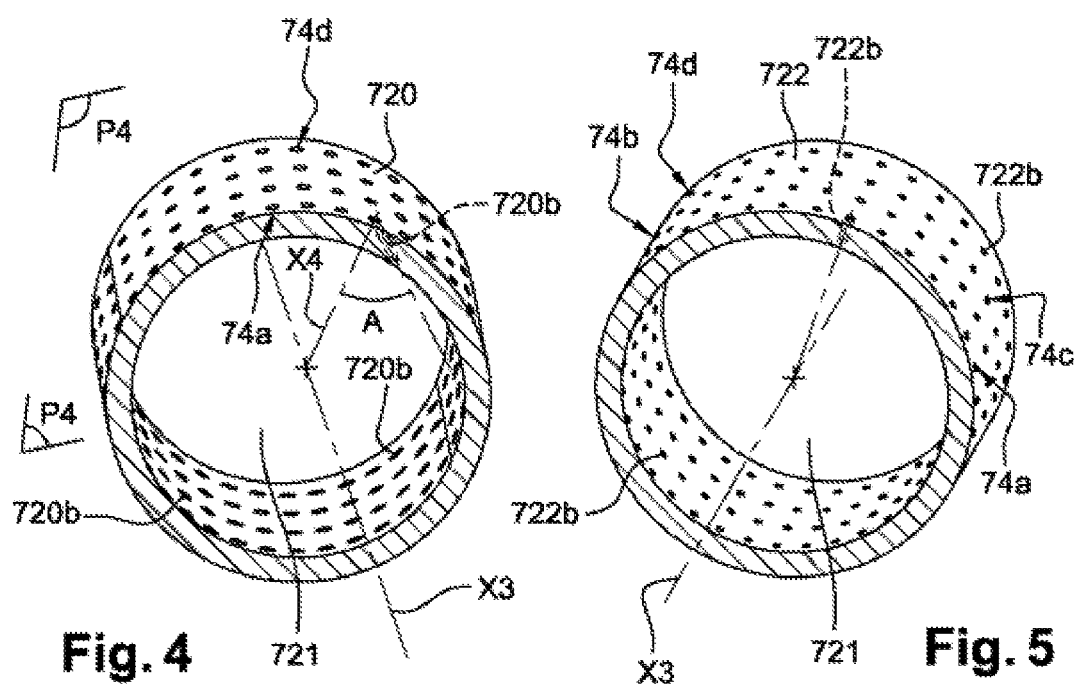
FIG. 5, an alternative embodiment (only the cylindrical portion of the duct is shown)

In FIG. 1, the combustion chamber 1 is contained inside an annular space around the axis X1 of the engine (aircraft turbine engine) 10, the axis X1 being the axis around which the rotor blades turn. The aforementioned space is limited by an outer casing 3. The axis X2 extending the combustion chamber 1 towards the inlet 2 of the turbine 4 of the engine 10 is angled relative to the axis X1. The combustion chamber 1 comprises one or more outer shrouds forming an outer wall 7 and one or more inner shrouds forming an inner wall 8, held together by flanges or supports. It is closed upstream (AM) by a chamber bottom 9 associated with upstream fairings 6. Fuel injectors 5 are distributed around the central axis X1 of the engine and lead, through openings made in the chamber bottom 9, into the combustion chamber: space 15 located between the walls 7 and 8. Each fuel injector is inserted into a bowl 11 comprising a nozzle that diverts a portion of the air that has entered into the faired zone in radial and swirling direction towards the pulverized fuel, and thus mixes the fuel with the air. A primary combustion zone is then formed immediately downstream (AV) from the chamber bottom, wherein the mixture is ignited by an electric spark plug 13, or a plurality of spark plugs distributed circumferentially, preferably two spark plugs. [ON] As disclosed in WO 2011/061143, FIG. 2 shows, in cross-section, the detail of the zone of the combustion chamber in which an opening is provided for passing a spark plug 13. For example, the outer wall 7 is bored by a circular opening 71 around which a radially oriented (axis X3) cylindrical tube is mounted relative to the outer wall 7, and in this case to the axis X2. This tube forms a duct 72 and defines a recess (72a, as shown in FIG. 2, and 721, as shown in FIGS. 4 and 5) for the spark plug 13 which passes, along the axis X3, through said duct forming a recess. The duct 72 comprises an upper bearing surface 73 in a plane 12b perpendicular to the axis X3 of the duct. The surface 73 is limited by a rim or wall 73' oriented radially outwards. A plug guide 75, mounted coaxially around the spark plug 13, rests on the surface 73. The plug guide 75 comprises a collar 76 and an insertion cone 77 around a portion of a guiding cylinder 78. It rests on the bearing surface 73 via the collar 76. The collar 76 can slide on the surface 73 until the wall 73', transversely to the axis X3. A cup 79 welded to the wall 73' holds the collar 76 radially against any radial movement beyond the wall 73'. The cylindrical surface portion of the guiding cylinder 78 has a diameter barely greater than that of the spark plug 13. The spark plug 13 can thus slide relative to the plug guide 75. The frusto-conical shape of the insertion cone 77 facilitates the insertion of the spark plug 13 into the plug guide when installing the chamber. The plug guide 75 thus seals the annular space between the spark plug 13 and the duct 72. This annular space is supplied with air by openings 72b oriented towards the surface of the spark plug 13.

Such an assembly makes it possible to track the relative movements resulting from thermal fluctuations and others between the chamber and the casing, the plug guide 75 being capable of moving along the bearing surface 73 inside the wall 73'.

However, it is observed that the duct is permeable at all operating pressures of the engine and the chamber: there are typically 12 to 25 openings 72b with an individual diameter of 0.6 mm to 1 mm, which are not staggered (all placed in one row in a plane perpendicular to the axis X3 of the duct 72). Openings 72b allow the passage of air during any phase of flight, even for pressures lower than $0.5 \times 10^5$ Pa. It is specified that the height H of the duct 72 is defined, parallel to the axis X3, between the base 12a thereof that limits same on the side of the shroud (the outer wall 7 in the example) and the opposite end thereof, in this case the plane 12b that is coplanar with the upper bearing surface 73 (on which the plug guide 75 rests).

It follows that the permeability of the shroud varies little when the pressure drops. Thus, the percentage of air passing into the plug guide under high pressure is almost identical to that passing under low pressure. This is unfavorable for ignition, since the flow rate for cooling the spark plug 13, under low pressure (typically $0.1 \times 10^5$ to $0.5 \times 10^5$ Pa), tends to separate the kerosene from the spark plug 13 and to extinguish the ignition cores, $0.3 \times 10^5$ Pa being a typical low-pressure condition during reignition at altitude.

Conversely, in the invention (see FIG. 3 and following), parallel to the axis X3 of the duct, the openings 720b, 722b that pass through the duct 720 or 722:
  are staggered over the height H of the duct, in a plurality of rows (74a to 74d in the example), each located in a plane P4 perpendicular to the axis X3, and, preferably, number between 50 and 500, at least some of them individually having a diameter of 0.2 mm to 0.6 mm.

Figure 3:
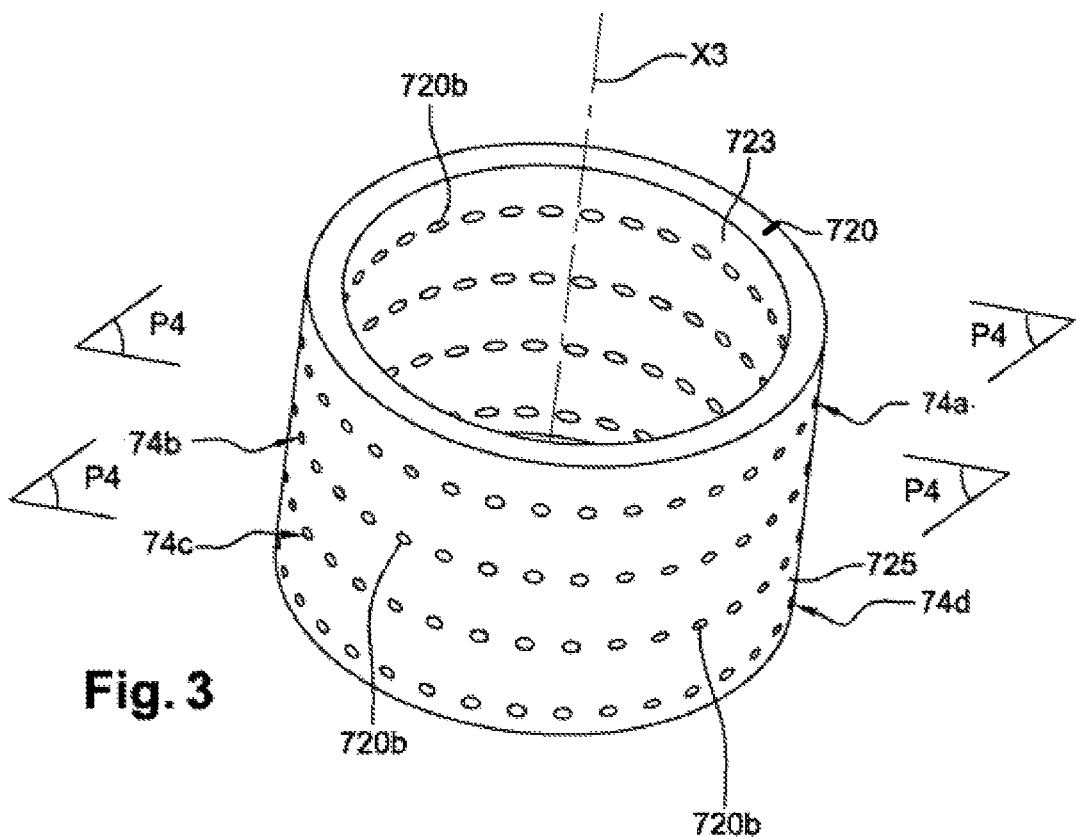
FIGS. 3 and 4, an improved embodiment of a plug guide (only the cylindrical portion of the duct is shown)

FIGS. 3 to 5: the duct 72 is effectively substituted by a duct 720 or 722 according to the invention, which will replace it in the embodiments of FIGS. 1 and 2.

Thus, the multi-perforated duct 720 or 722 will be almost impermeable to air at the aforementioned low pressures.

The various rows (e.g. 74a to 74d) of openings 720b or 722b will obviously extend between the inner face 723 and the outer face 725 of the duct similarly to openings 72b in duct 72 of FIG. 2.

The number of openings 720b, 722b will be adapted as a function of the size of the duct and the sought flow rate.

In practice, as a preferred example, it is possible to provide such a duct 720 or 722 having openings, 720b, 722b, respectively, which can number between 120 and 160, with an individual diameter of the order of 0.25 mm-0.45 mm.

Indeed, with identical duct structures (in particular the same heights H, same thicknesses, same duct diameters, same materials), we can estimate that it is necessary:
  in order to obtain, for example, a configuration equivalent to that of FIG. 2 (but also impermeable to air at the aforementioned low pressures), with presumed openings 72b having an individual diameter of 0.8 mm (20 openings, or 10 mm² of holes),
  around 140 openings 720b or 722b on the duct 720 or 722, with an individual diameter of 0.3 mm.

In fact, it is noted that the smaller the individual diameter of the openings 720b or 722b, the greater the number required. The limit on the number of openings is at least set by the ability to bore same in the duct, as well as by the minimum distance between two openings necessary for the mechanical strength of the part.

Moreover, the air permeability of these openings is characterised by the flow coefficients (Cd) thereof. The flow rate coefficient of an opening is the ratio between the actual air flow passing through same and the theoretical maximum air flow that can pass through same. This is lower than 1 due to the presence of the boundary layer.

And yet, the greater the thickness of the boundary layer compared with the diameter of the opening, the less flow can pass and the closer the flow rate coefficient is to 0. Conversely, the lower the boundary layer is compared with the diameter of the opening, the closer the flow rate coefficient is to its maximum value, 1.

The order of magnitude of the thickness of the boundary layer at the end of a length of 1 mm (thickness of the wall forming the duct) is 0.035 mm-0.045 mm, at $30 \times 10^5$ Pa and around +570° C. The thickness increases to 0.07 mm at around $10^5$ Pa, 27/29° C., and ends up at 0.10 mm at $0.210.4 \times 10^5$ Pa, at −25° C. (typical condition for reignition at altitude, around 10,000 m); see FIG. 6.

When the pressure drops, the size of the boundary layer increases, since the Reynolds number drops. The flow rate coefficient of the openings with small diameters tends towards 0. Conversely, for openings with a diameter of around 1 mm, the coefficient remains close to 1 across a very broad range of pressures (from windmilling conditions to full-throttle engine conditions). An estimation of the variation in the flow rate coefficient of openings 720*b* or 722*b* for cooling a plug guide as a function of the intake pressure air is presented in FIG. 7, for different opening diameters (logarithmic pressure scale). The flow rate ratio between the two configurations (Phi 0.8 and Phi 0.3) with geometric iso-section is presented on the right-hand axis. "Phi" designates the diameter of an opening 720*b*, 722*b*.

FIGS. 3 to 5 distinctly show that at least some of the (in the example, all of the) openings 720*b* or 722*b* are arranged in said different rows, in this case four rows (74*a* to 74*d*) over the height H, each extending in a plane perpendicular to the axis X3 of the duct.

FIG. 5: the openings 722*b* have, at least essentially, an individual orientation perpendicular to the axis X3; see dotted lines indicating one of these openings.

Figure 8:
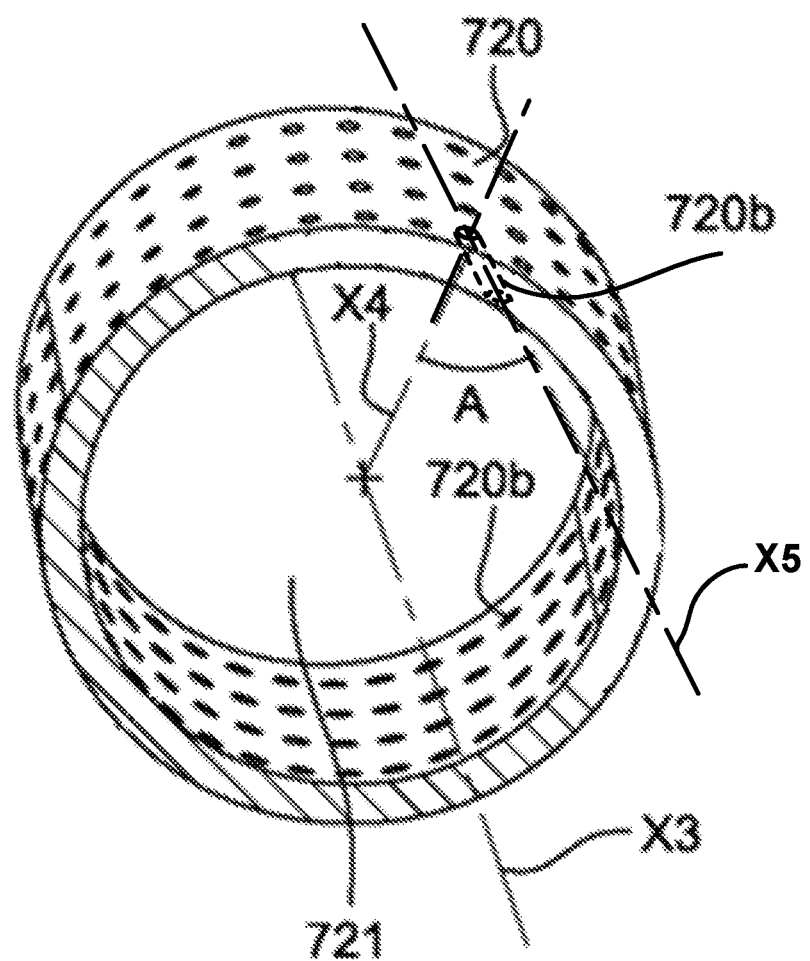
FIG. 8 is an expanded version of FIG. 4, as described herein.

However, to reinforce the effect of a reduction of the flow rate coefficient in the openings in question, when the pressure drops, it is also proposed in FIGS. 3 and 4, in addition to having reduced the diameter of the openings and having increased their number relative to those of 72*b* (to maintain the section through which the expected air flow passes), to angle the openings 720*b* individually, in this case in the azimuthal direction X5, shown in FIG. 8 which is an expanded version of FIG. 4. By elongating the openings 720*b*, indicated by dashed lines, in the wall forming the duct, the effect of the reduction of the flow rate coefficient with pressure is increased.

Thus, at least some of the (in the example, all of the) openings 720*b* passing through the duct 72 as shown in FIGS. 4 and 8 may be individually angled along a direction X5 relative to a direction X4 perpendicular to the axis X3 of the duct. FIG. 8 shows axis X3 and azimuthal direction X5 only for the opening 720*b* depicted with dashed lines.

And likewise, in the preferred solution in terms of cooling equilibrium and quality via said openings and ease of production, it is proposed for at least some of the (in the example, all of the) openings 720*b*, 722*b*:

to extend in directions belonging to a series of planes P4 perpendicular to the axis X3 of the duct (rows 74*a*-74*d*), in other words, all of the openings, in one row, and extending from outer surface 725 to inner surface 723 of duct 720, 722 have a length belonging to the same plane P4, and to be straight, where they respectively cross the duct wall 720 or 722.

The openings 720*b* or 722*b* of the same row (e.g. 74*a* to 74*d*) will be favorably oriented in directions belonging to the same plane (individual plane P4) perpendicular to the axis X3.

The openings 720*b* of the same row (e.g. 74*a* to 74*d*) will then be angled in directions (individual angles A; FIG. 4) belonging to the same plane P4 perpendicular to the axis X3.

This arrangement will favour production as well as homogeneous air distribution. This will also allow for improved cooling of the spark plug in question, in line with the overall objective.

Figures 6, 7:
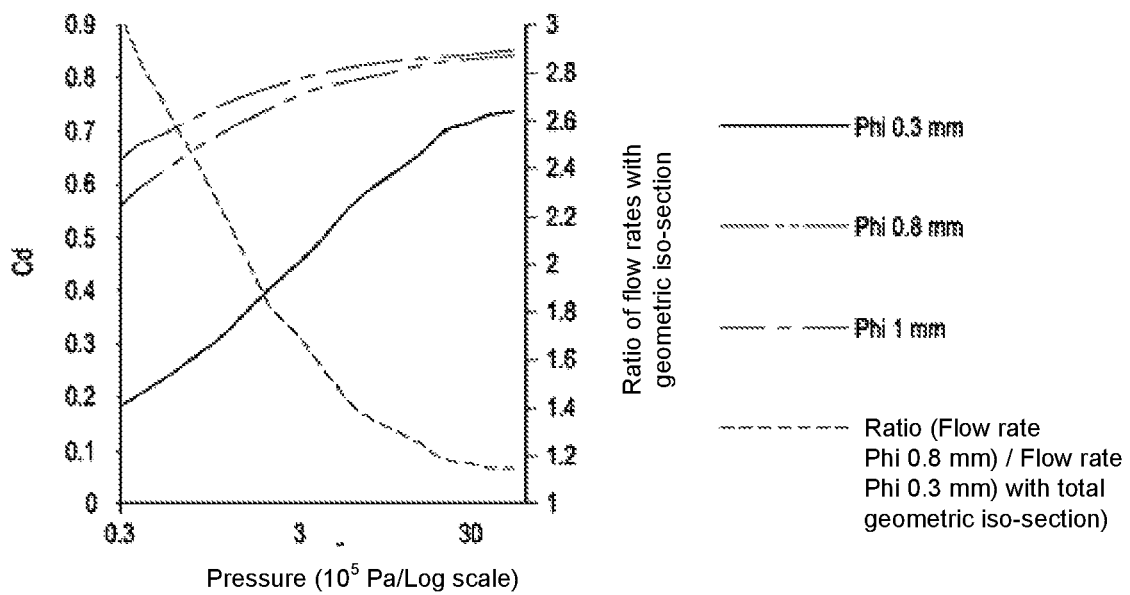
FIG. 6, a table that compares the effect of increasing the length of openings according to one embodiment of the invention with the measured thicknesses of the boundary layer.
FIG. 7, for different opening diameters, an estimation of the variation of the flow rate coefficient (Cd) of openings (here 720b) for cooling a plug guide as a function of the intake air pressure (logarithmic scale). The right-hand axis also presents, with global geometric iso-section, the flow rate passing through holes with a diameter of 0.8 mm divided by the flow rate passing through 0.3 mm holes.

Thus, in reference to the solution of FIG. 3, 4 or 8, with openings 720*b* configured as shown and described above, each having an angle A of 50° to 70°, typically 60°, in one of said planes P4, between an azimuthal direction X5 along opening 720*b* and relative to an axis X4 normal to the axis X3, the individual lengths thereof will be multiplied by approximately two, compared with an orientation according to axis X4 (cf. FIG. 5). The table of FIG. 6 compares the effect of increasing the length of the openings 720*b* and the boundary layer thicknesses.

FIGS. 3 to 5: the duct can be presumed to be provided with an upper bearing surface (like 73), or with a peripheral rim or wall (as in 73'), as in FIG. 2. However, a simply cylindrical embodiment is also possible. The axial height (according to X3) will then define said height H.

The invention claimed is:

1. A combustion chamber of a gas turbine engine for an aircraft, the combustion chamber comprising:
    one or more outer shrouds forming an outer wall of the combustion chamber; one or more inner shrouds forming an inner wall of the combustion chamber;
    a duct about a first axis extending with a height of the duct, the duct extending radially outward from the outer wall and mounted to the outer wall so as to be fixed thereto, around a hole of the outer wall, the duct comprising a duct wall forming internally a recess for a spark plug, the recess emerging into an inner space of the combustion chamber, through the hole; and
    a plug guide mounted on the duct so as to be transversely mobile relative to the first axis of the duct, the duct being crossed by openings that pass through the duct wall for injecting air into the combustion chamber, each of the openings being about a respective second axis that extends lengthwise with each of the openings and that is nonparallel to the first axis,
    wherein the openings are arranged in a plurality of rows, the plurality of rows being staggered at different heights along the height of the duct, one or more of the openings individually having a diameter of 0.2 mm to 0.6 mm.

2. The combustion chamber according to claim 1, wherein the openings passing through the duct wall number between 50 and 500.

3. The combustion chamber according to claim 2, wherein the respective second axis of each of the one or more of the openings passing through the duct wall are angled individually relative to an axis perpendicular to the first axis and passing through an end of the respective opening on an outer face of the duct.

4. The combustion chamber according to claim 2, wherein the respective second axis of each of the one or more of the openings are individually angled perpendicular to the first axis of the duct.

5. The combustion chamber according to claim 2, wherein each row comprises the one or more of the openings, the respective second axes of each of the one or more openings of each row being in a plane that is perpendicular to the first axis of the duct.

6. The combustion chamber according to claim 1, wherein the respective second axis of each of the one or more of the openings passing through the duct wall is angled individually relative to an axis perpendicular to the first axis and passing through an end of the respective opening on an outer face of the duct.

7. The combustion chamber according to claim 6, wherein each of the openings, individually angled relative to said axis perpendicular to the axis of the duct wall, individually in a direction belonging to a plane perpendicular to the first axis of the duct.

8. The combustion chamber according to claim 6, wherein each row comprises the one or more of the openings, the respective second axes of each of the one or more openings of each row being in a plane that is perpendicular to the first axis of the duct.

9. The combustion chamber according to claim 1, wherein each row comprises the one or more of the openings, the respective second axes of each of the one or more openings of each row being in a plane that is perpendicular to the first axis of the duct.

10. The combustion chamber according to claim 1, wherein the openings passing through the duct number between 120 and 160.

11. The combustion chamber according to claim 1, wherein the one or more of the openings individually have a diameter that is between 0.25 mm and 0.45 mm.

12. The combustion chamber according to claim 11, wherein the openings passing through the duct number between 120 and 160.

13. A gas turbine engine for an aircraft comprising the combustion chamber according to claim 1.

14. A spark plug assembly of a combustion chamber of a gas turbine engine for an aircraft, the combustion chamber comprising:
a duct mounted to an outer wall of the combustion chamber, the duct extending radially outward from the outer wall so as to be fixed to the outer wall and having a first axis extending with a height of the duct, the duct comprising a duct wall forming internally a recess for a spark plug emerging into an inner space of the combustion chamber; and
a plug guide mounted on the duct so as to be transversely mobile relative to the first axis of the duct, the duct being crossed by openings that pass through the duct wall for injecting air into the combustion chamber, each of the openings being about a respective second axis that extends lengthwise with each of the openings and that is nonparallel to the first axis,
wherein the openings are arranged in a plurality of rows, the plurality of rows being staggered at different heights along the height of the duct, one or more of the openings individually having a diameter of 0.2 mm to 0.6 mm, and wherein the openings passing through the duct number between 50 and 500.

15. The spark plug assembly according to claim 14, wherein the openings passing through the duct number between 120 and 160.

16. The spark plug assembly according to claim 14, wherein the one or more of the openings individually have a diameter that is between 0.25 mm and 0.45 mm.

17. The spark plug assembly according to claim 16, wherein the openings passing through the duct number between 120 and 160.

18. A spark plug assembly of a combustion chamber of a gas turbine engine for an aircraft, the spark plug assembly comprising:
a duct mounted to an outer wall of the combustion chamber, the duct extending radially outward from the outer wall so as to be fixed to the outer wall, and having a first axis extending with a height of the duct, the duct comprising a duct wall forming internally a recess for a spark plug emerging into an inner space of the combustion chamber; and
a plug guide mounted on the duct so as to be transversely mobile relative to the first axis of the duct, the duct being crossed by openings that pass through the duct wall for injecting air into the combustion chamber, each of the openings being about a respective second axis that extends lengthwise with each of the openings and that is nonparallel to the first axis,
wherein the openings are arranged in a plurality of rows, the plurality of rows being staggered at different heights along the height of the duct, at least some of the openings individually having a diameter that is between 0.25 mm and 0.45 mm.

* * * * *